Aug. 29, 1939.   E. L. WOODBURY   2,171,169
SAW FILE GUIDE
Filed Jan. 18, 1937          2 Sheets-Sheet 1
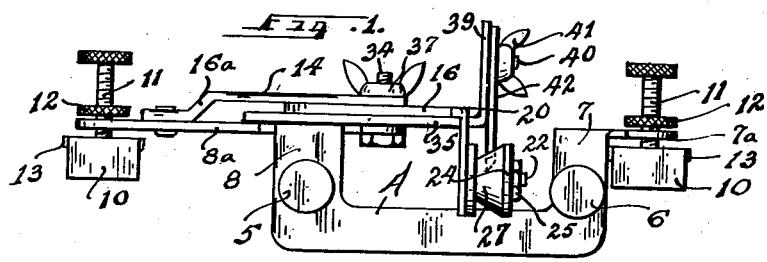
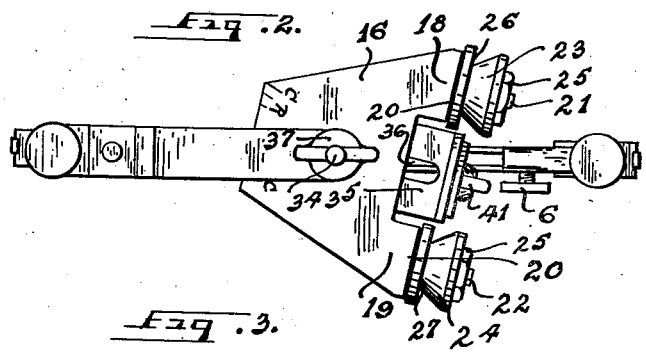
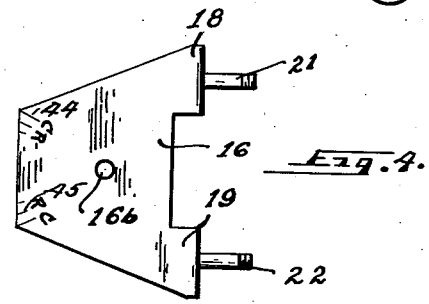
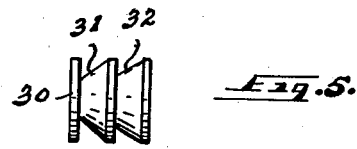
Inventor
Elias L. Woodbury
By R. M. Thomas
Attorney Aug. 29, 1939.  E. L. WOODBURY  2,171,169
SAW FILE GUIDE
Filed Jan. 18, 1937  2 Sheets-Sheet 2
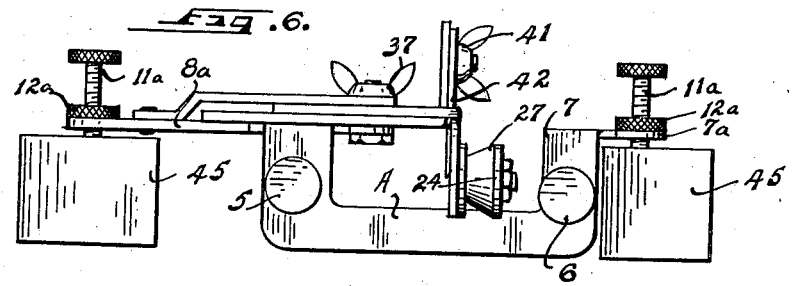
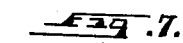
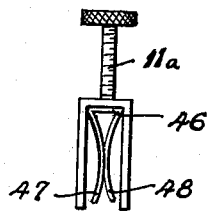
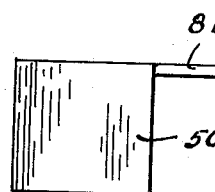
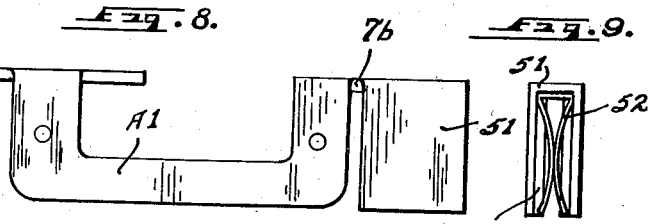
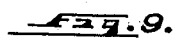
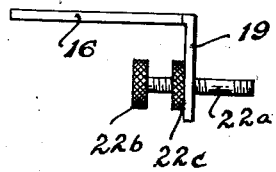
Inventor
Elias L. Woodbury
By R. M. Thomas
Attorney Patented Aug. 29, 1939

2,171,169

UNITED STATES PATENT OFFICE 2,171,169

SAW FILE GUIDE

Elias L. Woodbury, Salt Lake City, Utah, assignor of forty per cent to Hugh B. Sprague and forty per cent to Clarence I. Justheim, both of Salt Lake City, Utah Application January 18, 1937, Serial No. 121,050

2 Claims. (Cl. 76—36)

My invention relates to gauges for filing saws and has for its object to provide a new and efficient gauge which will be adapted to file any saw whether it be a rip saw or a cross cut saw and which is adaptable to fit any pitch of teeth and any desired angle of cut.

A further object is to provide a saw filing gauge which is clamped to the saw and held in position by suitable means and which will be advanced manually for each successive tooth filed but, which when set for a certain depth and pitch of tooth, will not be varied and will cause each succeeding tooth to be cut on the same angle, same pitch, and same depth, as the first tooth filed.

A still further object is to provide a saw gauge which may be used to file all of the teeth of a saw from one end to the other, on one side and then reversed and the other alternate teeth filed in the opposite angle as is required for filing the teeth of a saw.

A still further object is to provide a saw gauge for filing the teeth of a saw which gauge is adjustable longitudinally and vertically to fit any saw.

These objects I accomplish with the device illustrated in the accompanying drawings in which similar numerals and letters of reference indicate like parts throughout the several views and as described in the specification forming a part of this application and pointed out in the appended claims.

In the drawings—

Figure 1 is a side elevation of the device.

Figure 2 is a plan view of the device with the pivoted portion thereof set for filing a cross cut saw.

Figure 3 is an inverted plan view of the saw engaging body.

Figure 4 is a plan view of the pivoted portion removed from the body of the device showing the extended roller holding shafts.

Figure 5 is a plan view of a double file roller.

Figure 6 is a side elevation of one of the saw file gauges with the end adjusting means made larger and provided with springs for holding the saw gauge on the saw.

Figure 7 is an end view of one of the adjusting devices, removed from the device.

Figure 8 is a side elevation of the saw channel body of one of the devices with the ends made for holding the saw not shown adjustable but with tension springs for holding the device onto a saw.

Figure 9 is an end view of Figure 8.

Figure 10 is an elevation of the gauge plate showing a modified form of adjustable shaft for the file guide rollers.

In the drawings I have shown my device as made with a saw engaging channel body A, having set screws 5 and 6 inserted through the two ends thereof to engage with the side wall of the saw and hold the channel body onto the saw.

The body A as shown is U-shaped when looking at it from the side and the top end of the leg 7 extends upwardly and forwardly in a horizontal strip 7a to carry depth gauge for the saw engaging channel and the top end of the leg 8 extends back to carry the balance of the adjusting and filing portion of the device on a flat horizontal strip 8a.

The adjusting depth gauge carried on the front end of the leg 7 is duplicated at the rear end of the leg 8 and are identical so I will describe but one of them. These adjusting members consist of channel saw engaging members 10 mounted on vertical threaded shafts 11, said shafts being passed through threaded holes in the flat horizontal end of the two strips 7a and 8a. The top of the shafts 11 are made into thumb nuts having their edges knurled and the shafts carry locking nuts 12 also having their perimeter knurled to make them easy to tighten or loosen as desired. In the channels 10 I provide saw tooth engaging strips 13 of soft metal to prevent injuring the saw teeth. Onto the strip 8a of the body A I then mount a bracket 14 which has a raise 16a therein to space it from the body and in this space I mount the pivotal file gauge carrying plate 16 which gauge plate has its wide end formed into two strips 18 and 19 which strips are bent down at 20 and carry stub shafts or forwardly extended shafts 21 and 22. These shafts carry file guide rollers 23 and 24, said rollers being held on the shafts by nuts 25. The file guide rollers 23 and 24 are formed of a round body having angled annular grooves 26 and 27 respectively formed therein, said grooves being formed in the desired angle for sharpening the saw either cross cut, or rip and may be made as single rollers as shown in Figures 1 and 2, or may be made as double rollers as shown in Figure 5. In this figure which is a view of only one roller, the cylinder is shown as 30 having an annular groove 31 formed for a rip saw and a like groove 32 formed for a cross cut saw and when the two are used, there need be no changing of the sets of rollers, as would be necessary to sharpen different saws with single rollers.

As will be obvious, the angles in the roller 30 may be as shown, or may be opposed in direction.

Between the strip 8a and the bottom of the plate 16 I mount my longitudinally adjustable gauge plate 35 which plate has a slot 36 therein and through this slot the pivot bolt 34 of the entire device is mounted. This pivot bolt passes through the forward end of the strip 8a through the slot 36, through the hole 16a in the plate 16 and through the forward end of the bracket 14 and carries a thumb nut 37 thereon by which the forward and backward or longitudinal positioning of the plate 35 and the angled positioning or adjustment of the plate 16 is controlled and held in fixed relation to the channel body A.

The free end of the gauge plate 35 is turned up at 39 and has a hole bored to receive a bolt 40 which bolt carries a thumb nut 41 for adjustment of the vertical tooth engaging gauge member 42. The bottom end of the member 42 is beveled to fit down into the extreme bottom of the V of the saw teeth and the top end of the member is slotted to allow for vertical adjustment of the member so that any depth tooth and any angle of tooth may be filed with the one device.

The top of the plate 16 is marked at 44 and 45 to show the angle of set in relation to the channel body A and bracket 14 for either cross cut or rip saws.

In Figure 6 I have shown the device as provided with larger saw adjusting channels at each end shown as channels 45 in which saw blade engaging leaf springs 46 are mounted to allow the saw blade to be pressed into the channel between the two ends 47 and 48 of the spring 46 and hold the channel engaged on the saw. The channels are provided with the adjusting bolt 11a, the lock nut 12a, and the knurled head for adjusting of the vertical position of the entire body of the device by the adjustment of these two ends.

In Figures 8 and 9 I have shown the channel A1 with the legs 7b and 8b provided with large downwardly bent channels 50 and 51 each channel carrying a spring 52 therein identical in form to engage the saw blade in a manner similar to that of the springs 46 in the channels 45 but in this modified form of the device, the channels 50 and 51 are an integral part of the channel A1 and are not adjustable in any manner. For vertical adjustment of this form of the device, the plate 42 as shown in Figure 1 must be adjusted.

In Figure 10 I have shown a modified form of device in which the roller carrying shaft 22 is made adjustable and shown as 22a, with a knurled hand adjustable head 22b by which it may be adjusted and a lock nut 22c also knurled by which the position of the roller shaft may be adjusted. Thus the shaft 22a may be used for a single type of roller or a double type and may be used also to adjust the forward and backward positioning of the rollers instead of adjusting the plate 35 as desired. Suitable washers or like means may be employed between the rollers and the plate 16 if and when needed.

Having thus described my invention I desire to secure by Letters Patent and claim:

1. A saw filing guide consisting of a saw blade engaging body having spaced horizontal ends connected at their adjacent ends by U-shaped depending sides adapted to straddle a saw, means for securing said body onto a saw, a plate pivotally mounted at one end on the top side of one of said body ends for angular adjustment in relation to said body, the opposite end of said plate being bifurcated and depending to provide depending bifurcated legs, horizontally spaced forwardly extending stub shafts secured to said depending legs, rollers mounted for rotation on said stub shafts, said rollers having grooves in their peripheries to provide a guide for a file, depth gauge channel members adjustably mounted for vertical adjustment at the ends of said body horizontal ends, an index, means for mounting said index on said body for vertical adjustment, and for adjustment longitudinally of the body.

2. A saw filing guide set forth in claim 1, in which each of said rollers is provided with a plurality of different angled grooves.

ELIAS L. WOODBURY.